United States Patent [19]
Haun et al.

[11] Patent Number: 5,188,445
[45] Date of Patent: Feb. 23, 1993

[54] VEHICLE HAVING WARNING UNITS MOUNTED WITHIN HOOD CUTOUTS

[75] Inventors: Harold Haun, Longwood; Herschel W. Davis, Altamonte Springs; Robert D. Koger, Orlando, all of Fla.

[73] Assignee: Wheeled Coach Corporation, Winter Park, Fla.

[21] Appl. No.: 875,048

[22] Filed: Apr. 28, 1992

[51] Int. Cl.⁵ .............................. B60Q 1/26
[52] U.S. Cl. ........................ 362/80; 362/79; 362/83.3; 116/147; 296/194; 340/474; 180/69.2
[58] Field of Search ............... 362/61, 79, 80, 83.3, 362/253; 340/471, 472, 474, 384 R; 296/194; 180/69.21, 69.2; 116/3, 28 R, 147, 202

[56] References Cited

U.S. PATENT DOCUMENTS

| | | | |
|---|---|---|---|
| 1,676,431 | 7/1928 | Denman | 362/80 |
| 1,815,844 | 7/1931 | Hurley | 180/69.2 |
| 2,564,984 | 8/1951 | Lyman | 116/147 |
| 2,699,223 | 1/1955 | Brumbaugh | 180/69.2 |
| 2,784,303 | 3/1957 | Heiser | 362/61 |
| 3,439,326 | 4/1969 | Boudin | 362/80 |
| 4,262,277 | 4/1981 | Abonia | 340/471 |
| 5,136,276 | 8/1992 | Wayne | 340/472 |

*Primary Examiner*—Ira S. Lazarus
*Assistant Examiner*—Y. Quach
*Attorney, Agent, or Firm*—Shook, Hardy & Bacon

[57] ABSTRACT

An emergency response vehicle such as an ambulance is provided with a warning unit that provides a visual and audible warning signal. The warning unit is mounted in a recess or cutout in the hood which covers the engine compartment of the vehicle. This positioning of the warning unit avoids blockage of the air flow through the radiator required for cooling of the vehicle engine. Brackets or other suitable devices are used to mount the warning unit, preferably to a wall such as a radiator support, so that the warning unit remains stationary during opening and closing of the hood. The wall also serves to block rearward passage of the noise generated by the warning unit.

15 Claims, 1 Drawing Sheet

U.S. Patent    Feb. 23, 1993    5,188,445
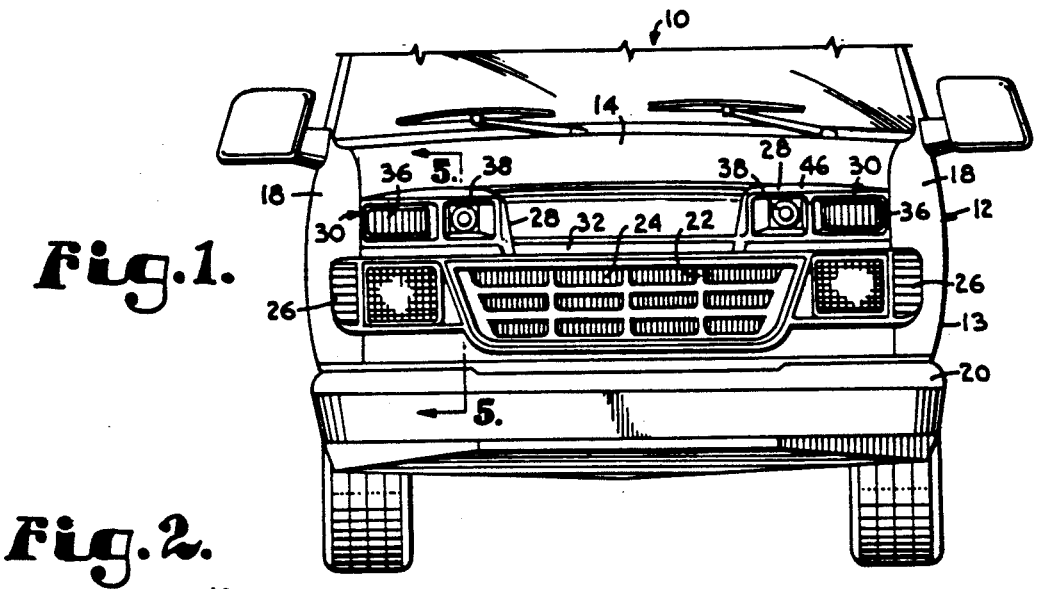
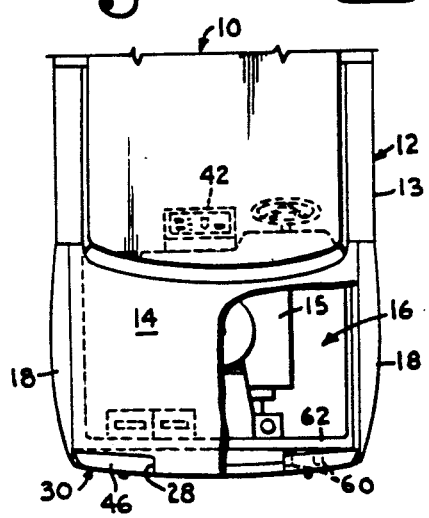
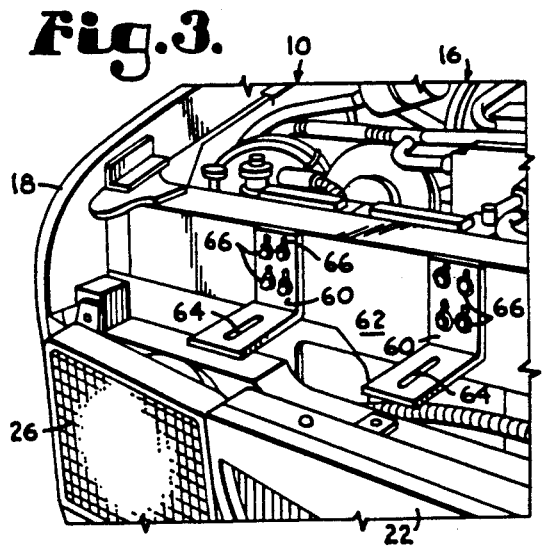
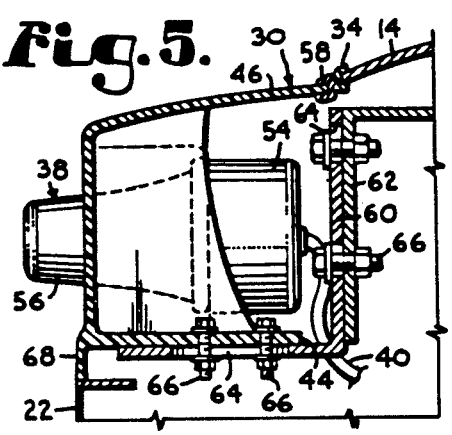
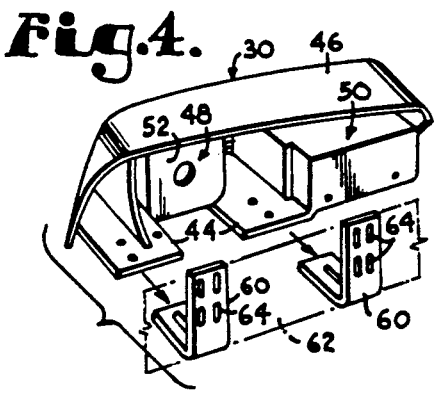

VEHICLE HAVING WARNING UNITS MOUNTED WITHIN HOOD CUTOUTS

BACKGROUND OF THE INVENTION

The present invention relates in general to emergency response vehicles, and, more particularly to an emergency response vehicle having a forwardly mounted warning unit.

Various types of ambulances and similar emergency vehicles are fabricated from incomplete vehicle chassis which are provided by automobile manufacturers. The incomplete chassis generally comprises the frame, engine and drive components, and at least a portion of the external body. The chassis is then completed by the addition of various components such as a module containing the desired patient support items. Among the many features added to the basic chassis by the ambulance fabricators are forward warning lights and sirens that are used to signal the presence of the ambulance to drivers in other vehicles. One type of warning unit that has gained widespread acceptance is one that combines a flashing light and siren into a compact device that can be mounted within the grill area of the vehicle. An example of a warning unit suitable for mounting within the grill is disclosed in U.S. Pat. No. 4,884,523 to Wheeler.

Mounting of a warning unit within the grill is desirable because the flashing lights and siren are located at the appropriate level for projection through the rear window of vehicles in front of the ambulance. This placement allows the noise signal to easily penetrate those vehicles and the flashing lights can be readily seen by drivers looking into their rear view mirrors. It has also been determined that this positioning of the warning unit allows the noise signal produced by the siren to be projected farther in front of the ambulance than when the siren is located on top of the ambulance. Because of these advantages, grill mounting of the warning units is now widely accepted both by manufacturers and by the general public which has become accustomed to identifying emergency vehicles by the location of the flashing lights and siren within the ambulance grill.

For many years the basic vehicle chassis supplied by one manufacturer remained substantially unchanged and ambulance builders became accustomed to mounting the forward warning units within the grill of ambulances fabricated from that chassis type. Recently, however, that chassis design has been extensively modified by the vehicle manufacturer. As a result of those modifications, a smaller grill area is now provided and presents a significant problem in the placement of the forward warning units within the grill area. In order to maintain the proper air flow through the radiator and engine compartment required to prevent overheating of the engine, the manufacturer initially directed that no air flow restricting accessories such as flashing lights and sirens be mounted in the grill. Placement of the warning units at other locations on the front end of the vehicle was considered generally undesirable by ambulance builders or was prohibited by the chassis manufacturer. For example, a siren mounted on the top, hood or fenders of the vehicle would produce a significant amount of noise within the ambulance which might exceed that permitted by governmental regulations, a hood or fender mounted unit might interfere with the line of sight of the ambulance driver, and a unit positioned on the hood would be subjected to jarring and possible damage each time the hood is closed. Mounting of the warning units on the front bumper is also discouraged by the manufacturer because of possible interference with the controlled crushing of the vehicle front end during a frontal collision.

In view of the perceived lack of alternative mounting locations for vehicle warning units, ambulance builders have reportedly obtained approval from the chassis manufacturer for the grill mounting of certain warning units that provide only limited air flow blockage. Despite this concession, a need still exists for a vehicle having a readily visible forward warning unit which does not block any of the air flow to the radiator and does not subject the ambulance occupants to objectionable noise levels.

SUMMARY OF THE INVENTION

It is an object of this invention to provide an emergency response vehicle, including one built from a manufacturer supplied ambulance chassis, having a visual and audible warning unit mounted at a location which does not interfere with air flow to the vehicle radiator and engine compartment but which is mounted at a position readily visible to drivers of other vehicles, such as by looking into their rear view mirrors, so that those drivers may take appropriate measures to allow for passage of the emergency response vehicle.

It is also an object of this invention to provide an emergency response vehicle, such as one built from a manufacturer supplied ambulance chassis, and having a visual and audible warning unit mounted at a location which does not interfere with the flow of air to the radiator and is recessed within the vehicle body so that the warning unit is less likely to be damaged or interfere with the aerodynamic profile of the vehicle.

It is another object of this invention to provide an emergency response vehicle having a forward warning unit of the type described which is mounted at a location which does not impede the line of sight of the driver but is readily accessible so that it may be easily serviced.

It is a further object of this invention to provide an emergency response vehicle having a forward warning unit which is mounted in front of a radiator support wall so that the wall blocks the rearward passage of the sound produced by the warning unit to reduce the noise levels within the vehicle.

It is a still further object of this invention to provide an emergency response vehicle with a forward warning unit that is mounted within a recess or cutout in the vehicle hood but which is mounted independently of the hood so that the warning unit remains stationary during opening and closing of the hood, thereby substantially reducing the jarring and possible damage that the warning unit would experience if mounted to the hood.

To accomplish these and other related objects of the invention, in one aspect the invention is related to a vehicle in which forward warning unit in positioned within a cutout in the vehicle hood and preferably is mounted separately from the hood so that the warning unit will remain stationary as the hood is opened and closed. Notably, the warning unit is located so that it is not within the air stream which is utilized for engine cooling purposes. More specifically, the invention is directed to a an emergency response vehicle comprising:
  a chassis;
  an engine supported on said chassis and positioned within an engine compartment;
  a radiator mounted in front of the engine;
  a grill positioned forwardly of the radiator and constructed to permit an air stream to flow through the grill and to the radiator for cooling thereof;
  a hood positioned in covering relation to at least a portion of the engine compartment, said hood being mounted for raising and lowering to provide access to the engine compartment;
  a cutout provided at a forward position in the hood; and
  a warning unit comprising a flashing light and a siren coupled with the vehicle chassis and positioned within said cutout in the hood.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a fragmentary front elevational view of an emergency vehicle in accordance with the present invention having warning units comprising flashing lights and sirens mounted within cutouts provided in the hood of the vehicle;

FIG. 2 is a fragmentary top plan view of the forward portion of the vehicle shown in FIG. 1 but on a reduced scale and with portions of the vehicle hood being broken away to shown the engine compartment and with broken lines being used to illustrate various internal features including a control panel for the warning units;

FIG. 3 is an enlarged fragmentary perspective view of a front part of the vehicle with the hood and one of the warning units removed to show the mounting brackets used to secure the warning unit to a radiator support wall within the engine compartment;

FIG. 4 is an exploded rear perspective view showing the cast housing of one of the warning units along with the mounting brackets used to mount the housing to the engine wall; and FIG. 5 is a side elevational view of the vehicle taken in vertical section along line 5—5 of FIG. 1 in the direction of the arrows to show one of the warning units and with portions of the warning unit being broken away to show internal components.

DESCRIPTION OF THE PREFERRED EMBODIMENT

Referring now to the drawings in greater detail, a vehicle in accordance with the present invention is represented generally by the numeral 10. Vehicle 10 may be an ambulance or other similar emergency response vehicle and will typically be constructed from an incomplete vehicle chassis provided by an automobile manufacturer such as Ford Motor Company. An example of one such vehicle chassis is a Ford Econoline Van which has been equipped with an ambulance preparation package.

Vehicle 10 comprises a chassis 12 which includes a body 13 and an engine hood 14 that covers an engine 15 in compartment 16. The hood 14 extends between front fenders 18 and is mounted on hinges (not shown) that allow for opening and closing of the hood 14 when access to the engine compartment 16 is desired. A front bumper 20 is suitably mounted below an open or pervious grill 22 at the front of vehicle 10. Grill 22 allows an air stream to flow through a radiator 24 that is positioned behind the grill 22 for engine cooling purposes and into the engine compartment 16. The air stream then escapes from the vehicle 10 by flowing out below engine 15. A pair of headlight and turn signal assemblies 26 are also mounted at the sides of grill 22. The above described components are of generally known construction and need not be described in greater detail herein.

In accordance with the present invention, a pair of cutouts 28 are provided in the hood 14 at locations to receive warning units 30. The cutouts 28 are positioned adjacent the fenders 18 and extend upwardly from a lowermost forward edge 32 of the hood 14. A sealing strip 34 (FIG. 5) is provided along the edge of each cutout 28 to cover the sharp edge of the cutout and to provide a seal against the associated warning unit 30. The lateral positioning of the cutouts 28 may of course be varied from that illustrated.

The warning units 30 comprise a warning light 36 which can be intermittently illuminated to provide a flashing visual warning signal and a siren 38 which provides an audible warning signal. The light 36 includes an external lens that is red or similarly colored as is customary for warning lights. Siren 38 may likewise produce any of the various types of sounds suitable for use on emergency vehicles. The siren 38 may also be in the nature of a loudspeaker useful for amplification and transmission of the voice of an occupant within the vehicle. This is contemplated by and is within the scope of the term "siren" as used herein.

The warning units 30 are operatively coupled by suitable wiring 40 with a control panel 42 which is positioned within the vehicle 10 at a location readily accessible to the vehicle driver. Each warning unit 30 includes a base 44 and an outer housing 46 which is made from cast aluminum and is generally configured to conform to the aerodynamic shape of the hood 14 when positioned within cutout 28. The housing 46 is segmented to provide separate compartments 48 and 50 for receiving the siren 38 and light 36.

Notably, the siren compartment 48 includes a wall 52 that separates a driver portion 54 from a cone 56 of siren 38. The wall 52 facilitates forward projection of the sound generated in siren cone 56 and partially blocks the rearward travel of the sound into the vehicle 10. The wall 52 thus serves to maximize outward projection of the sound while shielding the driver from objectionable noise levels. Each warning unit housing 46 is generally open at the back to provide access to the back of warning light 36 and siren 38 and the wiring 40 associated therewith. This allows the warning units 30 to be easily serviced by simply raising the hood 14 instead of removing the grill as is typically required for servicing conventional grill mounted warning units. A sealing strip 58 may optionally be provided along the edge of housing 46 to provide, a generally water-tight seal against the hood sealing strip 34.

The warning units 30 are mounted within cutouts 28 in hood 14 by a pair of L-shaped brackets 60 that are bolted to the front of a radiator support wall 62 within the engine compartment 16. The brackets 60 are mounted to the base 44 of the warning units 30 and slots 64 are provided in each bracket to allow for fore-and-aft and vertical adjustment of the positioning of the warning units. If needed, the warning units can be readily removed for servicing or replacement by simply disconnecting the wiring 40 and removing the bolts 66 used to connect the units 30 to brackets 60. The housing 46 for each unit 30 preferably includes a downturned lip 68 forward of base 44 which reduces air infiltration between the warning units 30 and the underlying headlights 26 and grill 22.

Advantageously, the mounting of warning units 30 to the front of wall 62, rather than in the grill 22 or at other customary locations on the vehicle 10, allows the wall 62 to function as a sound barrier to block the rearward propagation of the noise generated by siren 38 into the engine compartment. The wall 62 thus further reduces the noise level within the vehicle 10 and allows a louder siren 38 to be utilized to warn of the approach of vehicle 10 while still allowing the noise level in the vehicle 10 to remain within acceptable limits.

It can thus be seen that the warning units 30 are positioned at a height which allows the warning signals generated by sirens 38 and lights 36 to be readily projected into vehicles in front of the emergency response vehicle 10. Yet, because the warning units 30 are positioned above the grill 22 and out of the air stream flowing through the grill 22, they do not interfere with the air flow through the grill which is needed for engine cooling purposes. The placement of warning units 30 thus eliminates the risk of overheating of the engine 15 as a result of blockage of a portion of the air flow to the radiator 24. Despite the significant benefits obtained by the recessed mounting of the warning units 30, only a slight modification of the hood 14 to provide cutouts 28 is required for the placement of the units. Notably, because the hood 14 is not a structural member, the provision of cutouts 28 does not significantly impair the structural integrity of the hood 14 or vehicle 10.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An emergency response vehicle comprising:
    a chassis;
    an engine supported on said chassis and positioned within an engine compartment;
    a radiator mounted in front of the engine;
    a grill positioned forwardly of the radiator and constructed to permit an air stream to flow through the grill and to the radiator for cooling thereof;
    a hood positioned in covering relation to at least a portion of the engine compartment, said hood being mounted for raising and lowering to provide access to the engine compartment;
    a cutout provided at a forward position in the hood; and
    a warning unit comprising a flashing light and a siren coupled with the vehicle chassis and positioned within said cutout in the hood.

2. The emergency response vehicle as set forth in claim 1, including a wall positioned forward of the engine and wherein said first warning unit is mounted on said wall.

3. The emergency response vehicle as set forth in claim 2, wherein the radiator is mounted to the wall.

4. The emergency response vehicle as set forth in claim 3, including a second cutout in the forward position of the hood and a second warning unit positioned within the second cutout, said first and second cutouts being laterally spaced apart in said hood.

5. The emergency response vehicle as set forth in claim 4, including brackets mounting the first and second warning units to said wall, said first and second warning units being adjustable on said brackets in a fore-and-aft direction.

6. The emergency response vehicle as set forth in claim 3, wherein said warning unit includes a barrier wall positioned behind a sound generating portion of the siren to block rearward propagation of said generating sound.

7. An emergency response vehicle comprising:
    a chassis;
    an engine supported on said chassis and positioned within an engine compartment;
    a radiator mounted in front of the engine;
    a grill positioned forwardly of the radiator and constructed to permit an air stream to flow through the grill and to the radiator for cooling thereof;
    a hood positioned in covering relation to at least a portion of the engine compartment, said hood being mounted for raising and lowering to provide access to the engine compartment;
    a first cutout provided at a forward position in the hood; and
    a warning unit comprising a flashing light and a siren coupled with the chassis and positioned within said first cutout in the hood and out of said air stream, said first warning unit being mounted independently of the hood to permit raising and lowering of the hood without movement of the first warning unit.

8. The emergency response vehicle as set forth in claim 7, including a wall positioned forward of the engine and wherein said first warning unit is mounted on said wall.

9. The emergency response vehicle as set forth in claim 8, wherein the radiator is mounted to the wall.

10. The emergency response vehicle as set forth in claim 9, including a second cutout in the forward position of the hood and a second warning unit positioned within the second cutout, said first and second cutouts being laterally spaced apart in said hood.

11. The emergency response vehicle as set forth in claim 10, including brackets mounting the first and second warning units to said wall, said first and second warning units being adjustable on said brackets in a fore-and-aft direction.

12. The emergency response vehicle as set forth in claim 9, wherein said first warning unit includes a barrier wall positioned behind a sound generating portion of the siren to block rearward propagation of said generating sound.

13. An emergency response vehicle comprising:
    a chassis;
    an engine supported on said chassis and positioned within an engine compartment;
    a wall positioned in front of the engine;

a radiator mounted to said wall in front of the engine;

a grill positioned forwardly of the radiator and constructed to permit an air stream to flow through the grill and to the radiator for cooling thereof;

a hood positioned in covering relation to at least a portion of the engine compartment, said hood being mounted for raising and lowering to provide access to the engine compartment;

a pair of spaced apart cutouts provided at a forward position in the hood; and a pair of warning units each comprising a flashing light and a siren coupled with the chassis, one of the warning units being positioned within one of said spaced apart in the hood and the other of said warning units being positioned within the other of said spaced apart, said warning units being mounted on said wall and independently of the hood to permit raising and lowering of the hood without movement of the warning units.

14. The emergency response vehicle as set forth in claim 13, including brackets mounting the warning units to said wall, said warning units being adjustable on said brackets in a fore-and-aft direction.

15. The emergency response vehicle as set forth in claim 14, wherein said warning units each includes a barrier wall positioned behind a sound generating portion of the siren to block rearward propagation of said generating sound.

* * * * *